(12) United States Patent
Camenisch et al.

(10) Patent No.: US 8,555,072 B2
(45) Date of Patent: Oct. 8, 2013

(54) ATTESTATION OF COMPUTING PLATFORMS

(75) Inventors: Jan Leonhard Camenisch, Thalwil (CH); Jonathan A. Poritz, Colorado Springs, CO (US); Roger Daniel Zimmermann, Vancouver (CA)

(73) Assignee: International Business Machines Corporation, Armonk, NY (US)

( * ) Notice: Subject to any disclaimer, the term of this patent is extended or adjusted under 35 U.S.C. 154(b) by 491 days.

(21) Appl. No.: 12/439,236

(22) PCT Filed: Jul. 3, 2007

(86) PCT No.: PCT/IB2007/052586
§ 371 (c)(1),
(2), (4) Date: Jun. 15, 2009

(87) PCT Pub. No.: WO2008/026086
PCT Pub. Date: Mar. 6, 2008

(65) Prior Publication Data
US 2009/0271618 A1    Oct. 29, 2009

(30) Foreign Application Priority Data

Aug. 31, 2006 (EP) .................................... 06119945

(51) Int. Cl.
| | |
|---|---|
| *H04L 9/32* | (2006.01) |
| *G06F 11/30* | (2006.01) |
| *G06F 21/00* | (2013.01) |
| *H04L 29/06* | (2006.01) |
| *H04K 1/00* | (2006.01) |
| *G06Q 20/00* | (2012.01) |

(52) U.S. Cl.
USPC .............. 713/176; 713/155; 713/189; 380/30; 705/52; 705/76

(58) Field of Classification Search
USPC .................................................. 713/176–177
See application file for complete search history.

(56) References Cited

U.S. PATENT DOCUMENTS

2003/0226031 A1* 12/2003 Proudler et al. .............. 713/200

OTHER PUBLICATIONS

Efficient and Fine-Grained Remote Attestation on Web Services, 2005, IEEE, p. 1-8 (Jul. 11-Jul. 15 ISBN: 0-7695-2409-5).*
Yoshihama et al, WS-Attestation: Efficient and Fine-Grained Remote Attestation on Web Services, 2005, IEEE, p. 1-8 (Jul. 11-Jul. 15 ISBN: 0-7695-2409-5).*

* cited by examiner

*Primary Examiner* — Evans Desrosiers
(74) *Attorney, Agent, or Firm* — Gail H. Zarick; Anne Vachon Dougherty

(57) ABSTRACT

A method and apparatus for attesting the configuration of a computing platform to a verifier. A signature key (SK) is bound to the platform and bound to a defined configuration of the platform. A credential (C(SK), $C_{DAA}$(SK)) for the signature key (SK) is obtained from an evaluator. This credential (C(SK), $C_{DAA}$(SK)) certifies that the signature key (SK) is bound to an unspecified trusted platform configuration. The platform can then demonstrate to the verifier the ability to sign a challenge from the verifier using the signature key (SK), and demonstrate possession of the credential (C(SK), $C_{DAA}$(SK)) to the verifier, thereby attesting that the platform has a trusted configuration without disclosing the platform configuration to the verifier.

17 Claims, 3 Drawing Sheets

ATTESTATION OF COMPUTING PLATFORMS

This invention relates generally to attestation of computing platforms. More particularly, aspects of the invention relate to methods, apparatus and computer programs involved in the process of attesting the configuration of a computing platform to a verifier in a system where the verifier requires assurance that the computing platform has a trusted platform configuration.

Computers have evolved into tools for numerous applications, and the use of computer systems in one form or another is an increasingly essential part of everyday life. Security presents a major challenge in these systems. Comprehensive security features are essential to provide a trustworthy computing environment on which users such as consumers, businesses, government and financial institutions can rely for protection of their interests. One such security feature is a mechanism enabling a device to assure other devices operating within a trusted computing environment that it is trustworthy according to standards of trust specified for that environment. For example, a device should be able to demonstrate that it has not been subject to an attack resulting in unauthorized changes to its configuration. Such configuration changes might enable misuse of the device, allowing breaches of system security. It is this provision of assurances about device configuration that forms the essence of attestation processes.

The Trusted Computing Group (TCG) is an organization created to develop and promote open industry standards for trusted computing across diverse computing platforms, such as PCs, PDAs, mobile phones, servers, gateways and various other network devices and peripherals. TCG specifications promote hardware building blocks and software interfaces designed to enhance security against virtual and physical attacks. The heart of the Trusted Computing system is a component known as a Trusted Platform Module (TPM). The structure and operation of the TPM is defined in detail in Trusted Computing Group, TPM v1.2 Specification Changes (A Summary of Changes with respect to the v1.1b TPM Specification), October 2003, https://www.trustedcomputinggroup.org/groups/tpm/TPM_1_2_Changes_final.pdf. Briefly, the TPM is a hardware component in the form of a dedicated integrated circuit built into a variety of platforms. The TPM is equipped with an anti-tamper capability, providing secure storage for digital keys, certificates and passwords, as well as functionality for various security-related operations such as key generation, platform attestation, privacy protection functions and implementation of cryptographic algorithms and protocols.

The platform attestation functionality provided by TPMs is based on secure storage and reporting of platform configuration values. These values are derived from measurements of hardware and software configurations and are securely stored within the TPM in a set of Platform Configuration Registers (PCRs). More specifically, a hash algorithm is used to generate hash values from configuration measurements when a platform is first set up. Further hash values are generated and stored when changes are made to the platform configuration, and a log is maintained recording these changes. The hash values are stored in the platform configuration registers as so-called "PCR values". When attestation of the platform configuration is desired, the PCR values for the current platform configuration can be sent with the log to the party (referred to generally herein as "the verifier") requesting assurance of the platform's configuration. The verifier can then confirm that the hash values are correctly calculated and that the configuration represented by the PCR values corresponds to a trusted configuration. If not, further transactions with the platform may be denied.

The foregoing describes the attestation process in simple terms. In practice, additional security procedures are involved in the process. For example, the PCR values are sent to the verifier under a digital signature which can be authenticated by the verifier. According to the TPM specification, Attestation Identity Keys (AIKs) can be used for this purpose. An AIK is an RSA (Rivest, Shamir, Adleman) key pair and is specifically used as a signature key for signing PCR data. That is, the private key of the AIK pair is used to sign data sent to the verifier who then authenticates the signature by verifying the data using the public AIK key. The validity of the public AIK key can be ensured by some form of credential trusted by the verifier. For example, the platform may obtain a certificate on the AIK from a Trusted Third Party (TTP) such as a Certification Authority (CA). This certificate can then be sent to the verifier with the public AIK key. A more sophisticated approach involves use of an anonymous credential system such as the Direct Anonymous Attestation (DAA) protocol defined in the TCG specification referenced above. Briefly, this system allows a platform to obtain an anonymous credential which can be used to certify an AIK to a verifier without actually revealing either the credential or the key to the verifier. This is achieved through use of special cryptographic algorithms which allow the necessary proofs to be made to the verifier while maintaining anonymity.

The heart of the attestation process described above is the sending of platform configuration data (specifically PCR values and logs) to a verifier so that the verifier can validate the platform configuration. It is inherent in this process that the verifier learns details of the platform configuration. For example, the verifier may be able to determine which particular programs are running on the platform. In addition, multiple transactions with the same platform configuration can be linked. Indeed, in some applications a platform configuration might be effectively unique, whereby all transactions with that platform could be identified. These factors clearly compromise privacy, and privacy is one of the primary objectives of the TCG and indeed any trustworthy system.

While a basic attestation process has been described in the context of the TCG's Trusted Platform Module, various alternative or modified processes are known in the art. Some of these processes rely on use of an additional Trusted Third Party (TTP) and others do not, but all suffer to a greater or lesser extent from a privacy problem, and some present additional implementation and/or efficiency problems. Examples of attestation systems based on the TPM system above are provided by international patent applications published as WO 2005/038634A2 and WO 2005/038635A2. These primarily address aspects of system operation extending beyond the basic TPM attestation process. Alternatives are discussed in "Property-based Attestation for Computing Platforms: Caring about Properties, not Mechanisms", Sadeghi et al, NSPW '04: Proceedings of the 2004 workshop on New security paradigm, pages 67-77, ACM Press. This employs a TTP to validate platform configuration, the verifier receiving a certificate of the TTP giving an assurance statement about platform properties. This goes some way towards mitigating the privacy problem but requires the TTP to be involved in the transaction protocol between platform and verifier. Performance issues result from this "bottleneck", and the system is not adapted for implementation within the existing TPM v1.2 specification. Another modification is described in our US patent application published as US 2005/0229011 A1. In this system, PCR values are extended by random numbers and a TTP issues an assurance statement in the form of a credential warranty on these "obfuscated" PCR values. The obfuscated PCR values are then sent with the credential to a verifier. The verifier thus still receives PCR data, albeit obfuscated, and multiple transactions of the platform are linkable.

In light of the foregoing, it would be desirable to provide an attestation system in which various problems associated with known systems discussed above can be alleviated.

One aspect of the present invention provides a method for attesting the configuration of a computing platform to a verifier. The method comprises:

providing a signature key which is bound to the platform and bound to a defined configuration of the platform;

obtaining from an evaluator a credential for the signature key, the credential certifying that the signature key is bound to an unspecified trusted platform configuration; and demonstrating to the verifier the ability to sign a challenge from the verifier using the signature key, and demonstrating possession of the credential to the verifier, thereby attesting that the platform has a trusted configuration without disclosing the platform configuration to the verifier.

Attestation methods embodying the invention are therefore based on use of a special signature key which is bound both to the platform and to a defined platform configuration. The effect of this is that the signature key can only be used with that particular computing platform and only if it has the defined configuration. An evaluator such as a TTP can verify that this defined configuration corresponds to a trusted platform configuration, and can issue a credential to this effect for the signature key. However, because the signature key is inherently bound to the defined configuration, the configuration itself can remain unspecified in the credential. That is, the credential need include no platform configuration information. The platform can then demonstrate that it can sign a challenge from the verifier using the signature key, and by demonstrating the credential on the signature key the platform can assure the verifier that it has a trusted configuration without disclosing any specific configuration information to the verifier. Trust may be defined according to the TCG Glossary of Technical Terms as the expectation that trusted devices or trusted platform configurations will behave in a particular manner for a specific purpose. Furthermore, a Trusted Computing Platform or a trusted platform configuration may be defined according to the TCG Glossary of Technical Terms as a computing platform that can be trusted to report its properties. This aspect of the present invention represents an elegantly simple yet highly efficient platform attestation system in which the necessary assurance can be given to a verifier while providing full privacy protection for configuration details of the platform. Moreover, the system is eminently suitable for implementation within the context of the current TCG specifications, allowing the attestation mechanism to be readily adopted in TCG-based systems and offering the advantages of this attestation process within a sophisticated, efficient and widely-accepted trusted computing environment.

The platform may demonstrate its ability to sign the challenge simply by signing and returning the challenge to the verifier with a public key of the signature key. Similarly, possession of the credential can be demonstrated to the verifier by actually sending it to the verifier. However, additional privacy protection can be provided if the credential issued by the evaluator is an anonymous credential such as a DAA-like credential. Here, possession of the credential can be demonstrated to the verifier without actually disclosing the credential to the verifier, and the ability to sign the challenge can be demonstrated without sending the signed challenge or disclosing the public key of the signature key. This will be explained in more detail below.

Further aspects of the invention relate to operation of an evaluator and a verifier respectively in an attestation system employing the foregoing method. Thus, a second aspect of the present invention provides a method for certifying the configuration of a computing platform. This method comprises the following steps: receiving from the computing platform a public key of a signature key which is bound to the platform and bound to a defined configuration of the platform; receiving from the computing platform data indicative of said defined configuration; verifying that said defined configuration corresponds to a trusted platform configuration; and sending to the computing platform a credential for the signature key, the credential certifying that the signature key is bound to an unspecified trusted platform configuration. A third aspect of the invention provides a method for verifying attestation of the configuration of a computing platform. This method comprises the steps of: sending a challenge to the computing platform; receiving from the computing platform a demonstration of the ability of the computing platform to sign said challenge using a signature key bound to the computing platform and a demonstration of possession by the computing platform of a credential certifying that the signature key is bound to an unspecified trusted platform configuration; and authenticating said credential, thereby verifying that the computing platform has a trusted platform configuration without receiving a disclosure of the platform configuration.

Where features are described herein with reference to an embodiment of one aspect of the invention, corresponding features may be provided in embodiments of another aspect of the invention.

The invention also provides a computer program comprising program code means for causing a computer to perform a method according to any of the foregoing aspects of the invention. It will be understood that the term "computer" is used in the most general sense and includes any device, component or system having a data processing capability for implementing a computer program. Moreover, a computer program embodying the invention may constitute an independent program or may be an element of a larger program, and may be supplied, for example, embodied in a computer-readable medium such as a disk or an electronic transmission for loading in a computer. The program code means of the computer program may comprise any expression, in any language, code or notation, of a set of instructions intended to cause a computer to perform the method in question, either directly or after either or both of (a) conversion to another language, code or notation, and (b) reproduction in a different material form.

A further aspect of the invention provides apparatus for attesting to a verifier the configuration of a computing platform incorporating the apparatus, the apparatus comprising control logic adapted for performing a method according to the first aspect of the invention.

Another aspect of the invention provides apparatus for certifying the configuration of a computing platform, the apparatus comprising control logic adapted such that, in response to receipt from the computing platform of a public key of a signature key which is bound to the platform and bound to a defined configuration of the platform, and of data indicative of said defined configuration of the platform, the control logic: verifies that said defined configuration corresponds to a trusted platform configuration; and sends to the computing platform a credential for the signature key, the credential certifying that the signature key is bound to an unspecified trusted platform configuration.

An additional aspect of the invention provides apparatus for verifying attestation of the configuration of a computing platform, the apparatus comprising control logic adapted for performing a method according to the third aspect of the invention.

Preferred embodiments of the invention will now be described, by way of example, with reference to the accompanying drawings in which.

Figure 1:
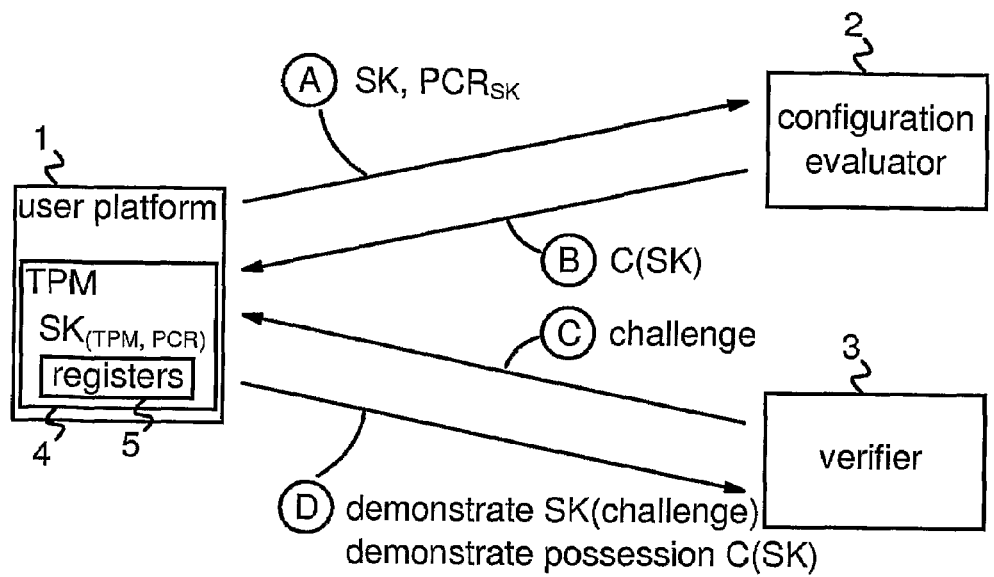
FIG. 1 is a representation of a computing system showing basic steps in operation of attestation methods embodying the invention.

FIG. 1 shows a schematic representation of one embodiment of a computing system in which attestation methods embodying the invention may be performed. The system comprises a computing platform 1, a configuration evaluator 2 and a verifier 3. The computing platform 1 is also denoted as user platform 1. The configuration evaluator 2 is also denoted as evaluator 2. Each of these components comprises control logic for implementing the steps of an attestation process to be described. In general, the control logic may be implemented in hardware or software or a combination thereof, and the specific nature of components 1 to 3 is largely irrelevant to fundamental operation of the attestation process. For the purposes of the present example, however, it will be assumed that each of the system components 1, 2 and 3 is implemented by general-purpose computer. In particular, platform 1 here is implemented by a user PC and includes a security module in the form of a Trusted Platform Module (TPM) 4. The structure and operation of TPM 4 is generally as defined in the TCG specification referenced earlier (the relevant content of which is incorporated herein by reference), with the additional functionality to perform an attestation process detailed below. Specific implementations of this functionality will be apparent to those skilled in the art from the description herein. The TPM 4 in user platform 1 includes a set of registers 5 for storing PCR values as described earlier. In general this set of registers 5 may include any number of individual PCR registers, though typically TPM chips include a minimum of sixteen registers. The evaluator 2 and verifier 3 in this example are similarly implemented by general purpose computers with respective computer programs for causing the computers to perform the steps of the attestation process. One example of a scenario involving such a system is where a consumer operating user PC 1 wishes to access a web service provided by a server running on verifier computer 3. In order to access this service the configuration of user platform 1 should be attested to the satisfaction of verifier 3. Configuration evaluator 2 represents a TTP in this scenario, i.e. an entity which is trusted by both the user and the verifier.

In embodiments of the invention, a special signature key SK is defined in the user platform 1. This signature key SK is bound to both the user platform 1, specifically to the TPM 4 thereof, and also to a defined configuration of the user platform 1. The effect of this binding is that the private key of the signature key SK is kept securely in the TPM 4, so that the signature key can only be used with that particular TPM (i.e. SK is non-migratable) and only if the user platform 1 has a defined configuration corresponding to a defined state of the PCR registers 5. This defined state of PCR registers 5 may be, for example, that the registers 5 contain a specified set of (one or more) PCR values, or that a set of stored PCR values satisfies a defined condition, e.g. that application of a predetermined hash function results in a specified hash value. In any case, in the TCG environment of the present embodiment, the signature key can be created by the TPM 4 using the command TPM_CreateWrapKEY, and is indicated in TPM 4 of FIG. 1 by $SK_{(TPM, PCR)}$ where the subscript indicates the binding just described.

Attestation processes embodying the invention involve the computing platform 1 obtaining a credential for the signature key SK from the evaluator 2. The purpose of this credential is to certify that the platform configuration to which the key SK is bound is a trusted platform configuration. The labeled arrows in FIG. 1 provide a simplified representation of the basic steps in operation of the attestation processes to be described. Arrow A indicates that the signature key SK (specifically the public key thereof) is sent to evaluator 2 with data indicating the specific PCR state to which the key SK is bound. This data is indicated by $PCR_{SK}$ in the figure. Evaluator 2 then verifies that the PCR state indicated by $PCR_{SK}$ corresponds to a trusted platform configuration, for example by checking the PCR state using the log. Assuming the PCR state is deemed trustworthy, evaluator 2 sends a credential C(SK) for the signature key back to platform 1 as indicated by arrow B. This credential may take a variety of forms but typically comprises some form of signature by the evaluator on the key SK. The main point here is that the credential does not include $PCR_{SK}$ or otherwise specify any information about the platform configuration. Subsequently when verifier 3 sends a challenge (e.g. a message or nonce) to platform 1 as indicated by arrow C, the platform can use the credential C(SK) to attest the validity of its configuration. Specifically, as indicated by arrow D, the platform demonstrates its ability to sign the challenge using the signature key SK and demonstrates possession of the credential C(SK) to verifier 3. The verifier 3 can authenticate the credential in known manner and, trusting evaluator 2, knows that the credential was issued for a key SK corresponding to a trusted PCR state. Moreover, because the key SK is bound to the PCR state verified by evaluator 2, the ability to use SK to sign the challenge is confirmation that the configuration of user platform 1 is trustworthy. In this way, the user platform configuration is attested to the satisfaction of the verifier 3 without either $PCR_{SK}$, PCR values in any form, or indeed any details of the platform configuration being disclosed to the verifier.

Figure 2:
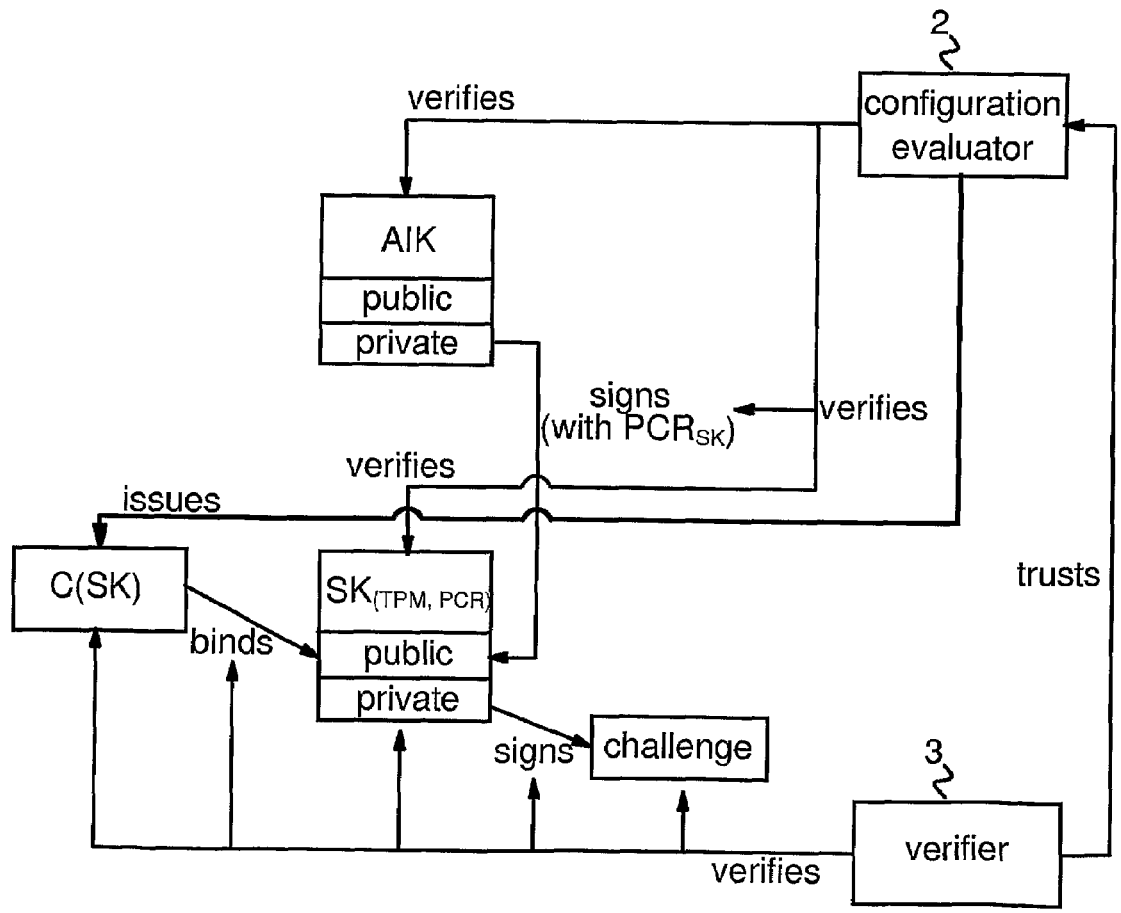
FIG. 2 is a schematic illustration of the operational details of one attestation method embodying the invention.

FIG. 2 is a schematic representation of an attestation method embodying the invention illustrating the processes involved in more detail. In this embodiment, the TPM 4 generates a certificate on the signing key SK using an Attestation Identity Key (AIK) discussed earlier. Specifically, as indicated in the figure, the private key of an AIK of TPM 4 is used to sign the public key of SK and the PCR state $PCR_{SK}$ to which SK is bound. This certification operation can be performed using the TCG command TPM_CertifyKey(AIK,SK) with the terms that SK is a non-migratable key of the same TPM 4 containing the AIK and its use is restricted to a PCR state defined by the variable $PCR_{SK}$. The resulting certificate is then sent to evaluator 2 with the public key of SK. (Here, since the AIK is used to sign the public SK key, this is inherently sent to the evaluator as part of the certificate). In this embodiment, the public AIK key is sent to evaluator 2 with the certificate. Evaluator 2 then authenticates the AIK (e.g. by verifying that the AIK is a trusted AIK known to the evaluator). Authentication of the AIK verifies the signature key SK, and the evaluator 2 then verifies the PCR state $PCR_{SK}$ as already described. The credential C(SK) is then issued, this being bound to the public SK key as indicated in the figure. Here this binding is achieved by incorporating the public SK key in the credential, e.g. the credential can be a signature by evaluator 2 on the public SK key. Platform 1 can then use the private SK key to sign the challenge of verifier 3 as indicated in the figure, and return this to the verifier 3 with the credential (incorporating the public SK key) to the verifier 3. This can be performed via the TCG TPM_Sign operation. Verifier 3 can then confirm that the challenge has been signed with the private key of the SK certified by credential C(SK), whereby the attestation process is complete.

Figure 3:
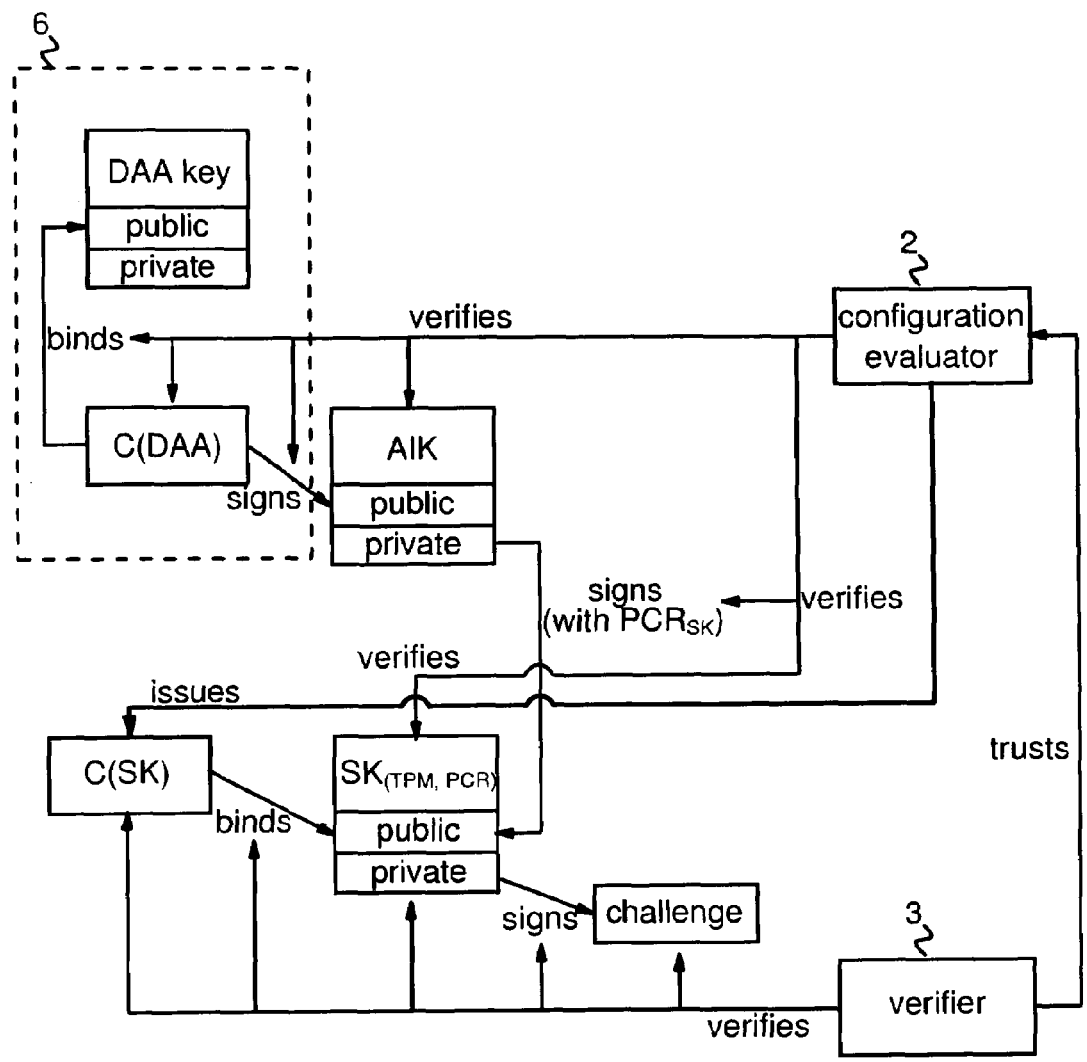
FIG. 3 shows a modification to the embodiment of FIG. 2.

The AIK in the foregoing embodiment could be authenticated by evaluator 2 in other ways. For example, the user platform 1 could provide a certificate on the AIK issued by a certification authority (CA) trusted by evaluator 2. Another alternative utilizes the DAA protocol mentioned earlier. This is shown schematically in FIG. 3 which corresponds generally to FIG. 2 but with box 6 illustrating the modification introduced by the DAA protocol. Here, user platform 1 has previously obtained a DAA credential C(DAA) from evaluator 2 (or another TTP). As indicated in the figure, the DAA credential C(DAA) is bound to the public key of a DAA key used to obtain the credential and protected by TPM 4. C(DAA) is used to provide verification of the AIK to evaluator 2 through use of special algorithms defined in the DAA protocol. These algorithms need not be described in detail here. It suffices to understand that they involve zero-knowledge proofs which allow the platform 1 to prove to evaluator 2 that it holds a signature, using the credential C(DAA), on the public AIK key without actually disclosing either the AIK key or the credential C(DAA) to the evaluator.

Depending on the level of anonymity required in the computing system, the signature key SK may be used for multiple transactions with multiple verifiers 3, multiple transactions with only a specific verifier 3, or only single transactions with a given verifier. Thus, more than one signature key may be provided by TPM 4 for use in transactions of the platform. Respective credentials C(SK) for these signature keys may be obtained in advance of transactions in which they will be used, the binding of the signature keys to the defined PCR state ensuring that the credentials cannot be used if the platform configuration is subsequently corrupted.

Figure 4:
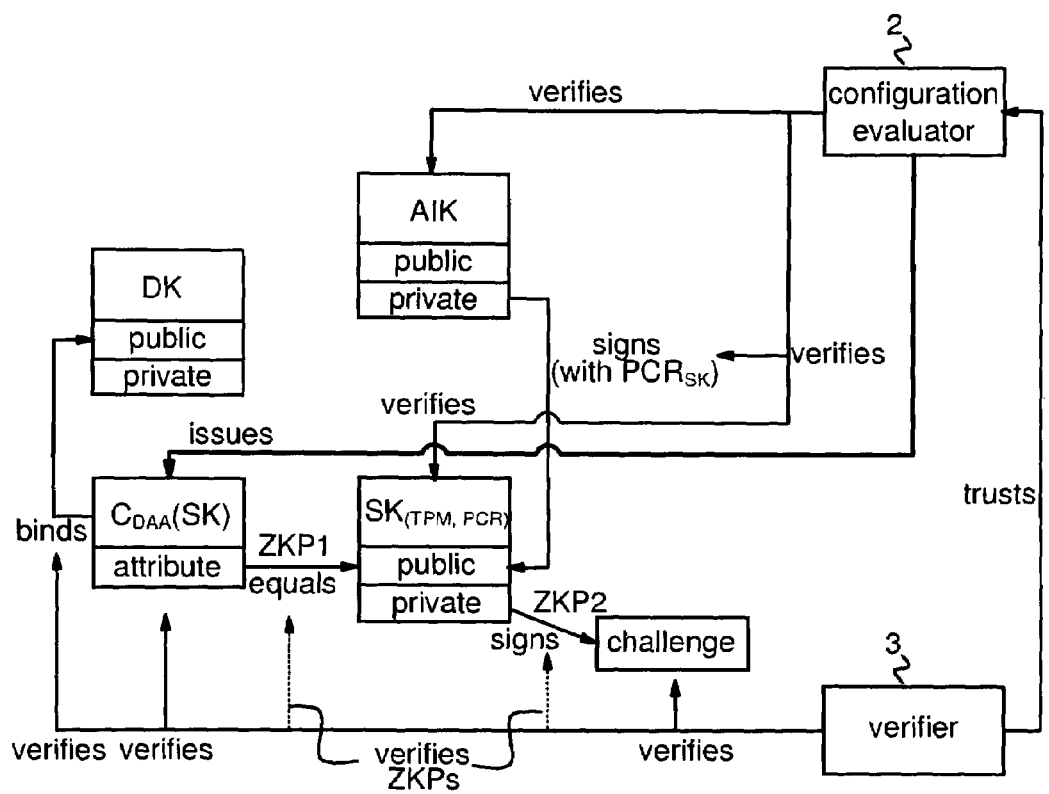
FIG. 4 is a schematic illustration of the operational details of another attestation method embodying the invention.

The schematic of FIG. 4 illustrates another embodiment of an attestation system providing a further enhancement of the FIG. 2 system. The basic system is broadly similar to that of FIG. 2, and only the differences will be described here. The main difference stems from the nature of the credential issued by the evaluator 2 for the signature key SK. Here this credential is an anonymous credential bound to the public key of SK. This anonymous credential may be a DAA-like credential as described earlier, and is represented in the figure by $C_{DAA}(SK)$. As indicated, this credential is bound to the public key of a DAA-like key DK used in obtaining the credential from the evaluator 2 as in the DAA system described above. However, unlike usual DAA credentials, the credential $C_{DAA}(SK)$ does not need to be bound to the platform 1. The credential $C_{DAA}(SK)$ is bound to the public key of SK by encoding of this public key as an attribute to the credential. (This can be done in generally known manner, the use of attributes being known in the art, e.g. as described in WO 2005/038635A2 referenced earlier).

In this embodiment, the credential $C_{DAA}(SK)$ allows the platform 1 to demonstrate possession of the credential to the verifier 3 without actually disclosing the credential or the public key of the signature key SK to the verifier. The platform can also demonstrate its ability to sign the verifier's challenge using SK without actually returning the signed challenge to the verifier. Specifically, platform 1 can demonstrate possession of the credential $C_{DAA}(SK)$, and its ability to sign the challenge, by: (1) proving knowledge of the credential $C_{DAA}(SK)$; (2) proving equality of the credential's attribute and the public key of SK; and (3) proving correctness of knowledge of the signature on the challenge with respect to the public key of SK as detailed in the algorithm below. Proof of knowledge of the credential can be done with a DAA-like protocol as will be apparent to those skilled in the art. In response to a challenge from the verifier, the platform 1 computes an RSA signature on the challenge using its private SK key. Note that the RSA signature algorithm is defined by the following algorithm (for details see the RSA PKCS#1 specification, RSA Laboratories, PKCS #1 v2.1 RSA Cryptography Standard, 2002, RSA Security Inc. ftp://ftp.rsasecurity.com/pub/pkcs/pkcs-1/pkcs-1v2-1.pdf, the relevant content of which is incorporated herein by reference):

$$s=H(m)^{(1/e)} \bmod n$$

where H is a hash function, m is the challenge, and n and e define the public signing key. In practice e is usually a fixed value ($2^{16}+1$). Now the platform proves that the public signing key SK is encoded in the credential $C_{DAA}(SK)$, and that the private key of SK was used in the signature on the challenge, without disclosing the public key. Hence the platform 1 computes the following commitments:

$$C_n = g^n * h^{(r_n)}$$

$$C_s = g^s * h^{(r_s)}$$

where $r_s$, $r_n$=random and, for example, g=$R_0$, h=S ($R_0$ and S being elements of the configuration evaluator's DAA public key as defined by the DAA protocol). Moreover, the platform generates proof that (1) $C_n$ contains the same n as the credential $C_{DAA}(SK)$, and (2) $C_s$ contains signature on m with respect to n. The various aspects of this system can thus be verified by verifier 3 as indicated in the figure, where ZKP indicates a zero-knowledge proof.

The system of FIG. 4 represents an even further improvement over earlier embodiments since the user platform 1 is wholly anonymous to the verifier 3. The same signing key can thus be used for multiple transactions with any verifiers without affecting anonymity. The user platform 1 does not need to trust the evaluator 2 from the privacy perspective, since even if the evaluator 2 were to disclose SK and its bound PCR state $PCR_{SK}$, this cannot be linked to the user platform 1 via the information disclosed to the verifier 3. If appropriate in a given scenario, the evaluator 2 may be the same entity as the verifier 3.

Various modifications may of course be made to the embodiments described above. For example, depending on the maximum attribute size of the credential $C_{DAA}(SK)$ in the FIG. 4 system, the encoded key may be split into multiple attributes. Also, the DAA protocol employed in the FIG. 3 embodiment to verify the AIK can equally be used in the FIG. 4 system. Embodiments of the invention may of course be employed in numerous computing systems other than the specific example of FIG. 1, and the platform, evaluator and verifier in such systems can be implemented by any form of computing device other than the specific examples described. Various other changes and modifications can be made to the specific embodiments described without departing from the scope of the invention.

The invention claimed is:

1. A method for attesting a defined configuration of a computing platform to a verifier, the method comprising:

generating a non-migratable signature key (SK) comprising a public key and a private key, which SK can only be used with the computing platform with a defined platform configuration;

providing the public key of the signature key (SK) which is bound to the computing platform and bound to the defined platform configuration of the computing platform and data ($PCR_{sk}$) indicative of said defined configuration;

obtaining from an evaluator a credential (C(SK), $CD_{AA}$(SK)) for the signature key (SK), the credential being generated using the public key and certifying that the signature key (SK) is bound to a trusted platform configuration based on said data ($PCR_{sk}$), wherein the defined trusted platform configuration is said trusted platform configuration; and demonstrating to the verifier an ability to sign a challenge from the verifier using the private key of the signature key (SK), and returning the signed challenge to the verifier with the public key of the signature key (SK); and demonstrating possession of the credential (C(SK), $CD_{AA}$(SK)) to the verifier, thereby attesting that the computing platform has said trusted platform configuration without disclosing the defined platform configuration of the computing platform to the verifier.

2. The method of claim 1, wherein the credential CDAA (SK) is an anonymous credential bound to a public key of the signature key (SK).

3. The method of claim 2 wherein the public key of the signature key (SK) is bound to the credential CDAA(SK) via encoding of the public key as at least one attribute of the credential.

4. The method of claim 2, further comprising: demonstrating said ability to sign the challenge and demonstrate possession of the credential CDAA(SK) by the steps of: proving knowledge of the credential CDAA(SK) to the verifier; proving to the verifier equality of the key bound to the credential CDAA(SK) and the public key of the signature key (SK); and proving to the verifier correct knowledge of the signature on the challenge with respect to the public key of the signature key (SK).

5. The method of claim 1 wherein said computing platform comprises a Trusted Platform Module having a set of registers for storing platform configuration values, wherein the signature key (SK) is bound to the Trusted Platform Module and said defined platform configuration comprises a defined state of said registers.

6. The method of claim 5 wherein the step of obtaining the credential (C(SK), CDAA(SK)) comprises: generating a certificate on the signature key (SK) using an Attestation Identity Key (AIK) of the Trusted Platform Module, the certificate indicating said defined state of the registers; and sending the certificate to the evaluator with a public key of the signature key (SK) and a verification of a public key of the Attestation Identity Key (AIK).

7. The method of claim 6 further comprising sending the public key of the Attestation Identity Key (AIK) to the evaluator to provide said verification of that public key.

8. The method of claim 6 further comprising sending said verification of the public key of the Attestation Identity Key (AIK) by demonstrating possession of a credential (C(DAA)) for that public key.

9. The method of claim 1 wherein a Trusted Platform module generates more than one signature key for use in transactions of the platform.

10. A method for certifying a defined configuration of a computing platform, the method comprising:

receiving from the computing platform a public key of a signature key (SK) which is bound to the computing platform and bound to a defined platform configuration of the computing platform;

receiving, from the computing platform, data ($PCR_{sk}$) indicative of said defined configuration;

verifying that said defined platform configuration corresponds to a trusted platform configuration based on comparison of the $PCR_{sk}$ to stored configuration information;

generating a credential (C(SK), $C_{DAA}$(SK)) for the signature key (SK) using the public key; and sending to the computing platform the credential (C(SK), $CD_{AA}$(SK)) for the signature key (SK), the credential certifying that the signature key (SK) is bound to a trusted platform configuration wherein the defined platform configuration is said trusted platform configuration;

wherein, demonstrating to a verifier an ability to sign a challenge from the verifier by signing the challenge using a private key of the signature key (SK) and returning the signed challenge to the verifier with the public key of the signature key (SK); and demonstrating possession of the credential (C(SK), $CD_{AA}$(SK)) by sending the credential to the verifier.

11. The method of claim 10 wherein the credential CDAA (SK) is an anonymous credential bound to the public key of the signature key (SK).

12. The method of claim 11 further comprising binding the credential CDAA(SK) to said public key by encoding the public key as at least one attribute of the credential.

13. The method of claim 11, further comprising: certifying the defined platform configuration of the computing platform comprising a Trusted Platform Module having a set of registers for storing platform configuration values, wherein said defined platform configuration of the computing platform comprises a defined state of said registers; receiving from the computing platform a certificate, generated using an Attestation Identity Key (AIK) of the Trusted Platform Module, on the signature key (SK), the certificate indicating said defined state of the registers; authenticating the Attestation Identity Key (AIK); and verifying that said defined state corresponds to a trusted platform configuration.

14. The method of claim 10, further comprising:

certifying the defined platform configuration of the computing platform comprising a Trusted Platform Module having a set of registers for storing platform configuration values, wherein said defined platform configuration of the computing platform comprises a defined state of said registers;

receiving from the computing platform a certificate, generated using an Attestation Identity Key (AIK) of the Trusted Platform Module, on the signature key (SK), the certificate indicating said defined state of the registers;

authenticating the Attestation Identity Key (AIK); and verifying that said defined state corresponds to a trusted platform configuration.

15. A method for verifying attestation of a defined platform configuration of a computing platform, the method comprising:

sending a challenge to the computing platform;

receiving from the computing platform a demonstration of an ability of the computing platform to sign said challenge using a private key of a signature key (SK) bound to the computing platform, and returning the signed challenge to a verifier with a public key of the signature key (SK); and said demonstration of possession by the computing platform of a credential (C(SK), $CD_{AA}$(SK)) generated by an evaluator based on the SK and data ($PCR_{sk}$) indicating said defined platform configuration and certifying that the signature key (SK) is bound to a trusted platform configuration; and authenticating said credential (C(SK), $CD_{AA}$(SK)), thereby verifying that the computing platform has said trusted platform configuration without receiving a disclosure of the defined platform configuration of the computing platform.

16. The method of claim 15 wherein: the credential CDAA (SK) is an anonymous credential bound to a public key of the signature key (SK).

17. The method of claim 16, wherein, as demonstration of said ability to sign the challenge and possession of the credential CDAA(SK), the method further comprises: receiving from the computing platform as demonstration of said ability to sign the challenge and possession of the credential CDAA (SK): proof of knowledge of the credential CDAA(SK) by the computing platform; proof of equality of the key bound to the credential CDAA(SK) and the public key of the signature key (SK); and proof of correct knowledge of the signature on the challenge with respect to the public key of the signature key (SK).

* * * * *